Figure 1:
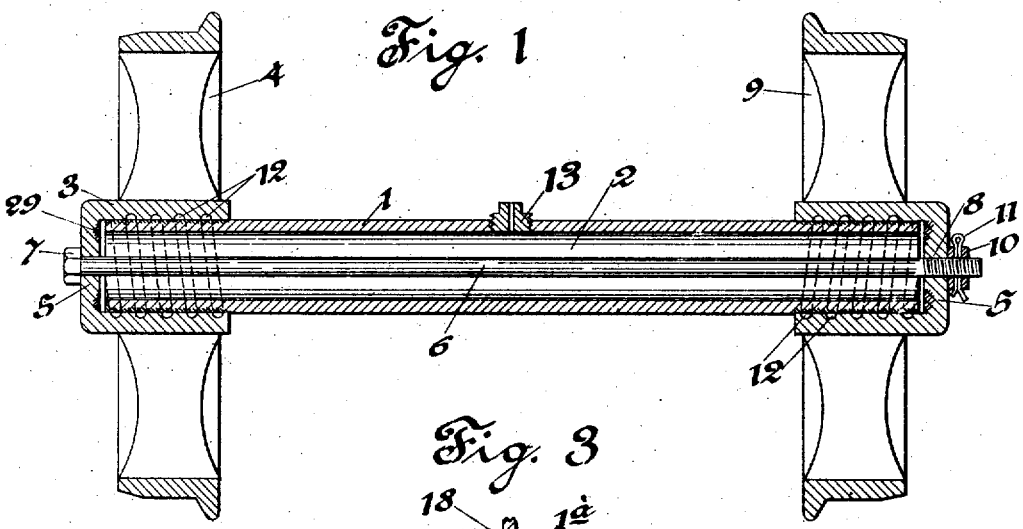

J. F. FOX.

RUNNING GEAR FOR CARS.

APPLICATION FILED JULY 16, 1915.

Reissued Nov. 9, 1915. 14,008.

Inventor

John F. Fox

Witnesses

Henry G. Frost

M. Smith

By Allen & Allen

Attorneys

UNITED STATES PATENT OFFICE.

JOHN F. FOX, OF BIRMINGHAM, ALABAMA.

RUNNING-GEAR FOR CARS.

14,008. Specification of Reissued Letters Patent. Reissued Nov. 9, 1915.

Original No. 1,068,385, dated July 22, 1913. Serial No. 737,751. Application for reissue filed July 16, 1915. Serial No. 40,328.

*To all whom it may concern:*

Be it known that I, JOHN F. FOX, a citizen of the United States, and a resident of Birmingham, in the county of Jefferson and State of Alabama, have invented certain new and useful Improvements in Running-Gear for Cars, of which the following is a specification.

My invention relates to a novel means for mounting wheels on axles and effectively lubricating the bearings of the running gear.

One object of my invention is to design running gear so that grease may be used as the lubricating medium as well as oil, and in my experiments I have found my object is best attained by providing a hollow axle which I fill with grease that works gradually into the bearings, being aided in this respect by centrifugal force when the axle is permitted to rotate.

A further object is to perfect the manner of retaining the wheels on their axles at the lowest possible cost and with a minimum of running friction between the retaining means and the moving parts of the running gear. As one feature of this part of my invention I reduce to a minimum the axle cost by using heavy metal tubing which preferably has its bearing portions and ends case hardened to reduce wear. This provides an axle of great strength for its weight and of small cost. It also provides without boring or machine work the most desirable character of grease reservoir as it is of uniform diameter throughout and permits the grease to flow from its ends into the bearings or through suitable openings provided for that purpose. As a second feature of this part of my invention I have devised wheel retaining means which take advantage of the hollow axle to practically eliminate all friction except in the bearings and to provide a wheel bearing most effectively closed against the admission of dust and dirt. This means in its preferred form is a metal rod or bolt which I pass centrally through the hollow axle and through the axial centers of the wheel hubs which fit over and close the open ends of the axle. This bolt is suitably fastened to the hubs and holds the wheels in running position on the axle. This construction permits of adjusting the wheels to or from each other for variations in track gage, and since the retaining means turns with the wheel free of the axle it will produce no friction unless one wheel be left to turn on it for compensating curves and the friction thereby produced is negligible. Since the wheels in this construction are tied together through the axle, the wheels and bolt can be allowed a small play on the axle so that in shifting laterally I obtain a pumping and force feed action on the grease.

The advantages of my construction are obtainable in running gear where one wheel is fixed on an axle that rotates and has the other wheel free thereon. Here I press the hub of the fixed wheel over on the end of the hollow shaft to close it and I may either pass the retaining rod through the hubs of the fixed and loose wheels or I may increase the axle's capacity for lubricant by welding a bolt retaining plug in the end of the axle which receives the loose wheel, the bolt acting to engage and adjustably hold the loose wheel in running position and the axle having lubricating openings opposite the several bearings.

My invention also comprises the novel features of construction and design of parts hereinafter more particularly described and claimed, reference being had to the accompanying drawings, in which:—

Figure 3:
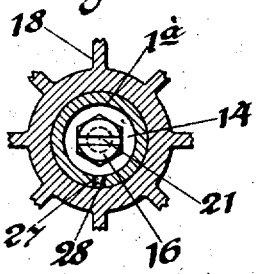
Figure 2:
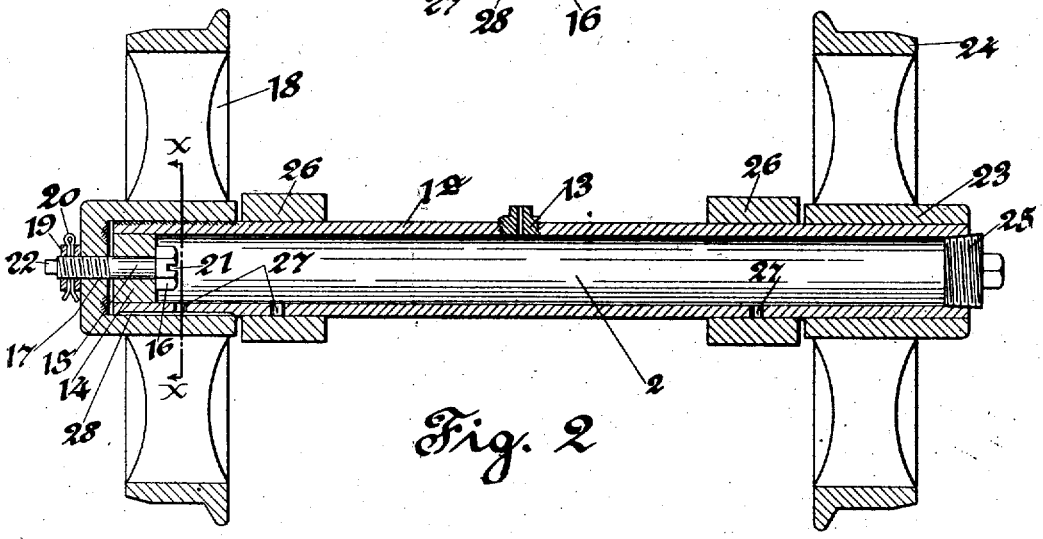

Figure 1 illustrates the preferred embodiment of my invention in which two loose wheels are tied on a fixed hollow axle by a central bolt. Fig. 2 illustrates my invention as applied to a fast and loose wheel arrangement on a rotating axle carrying a short bolt fixed in one end to hold the loose wheel in place. Fig. 3 is a cross section along the line $x$, $x$, of Fig. 2.

Similar reference numerals refer to similar parts throughout the drawings.

I have considered it unnecessary to illustrate any portion of the car, vehicle or truck in connection with which my running gear is to be used as this may be of any standard design.

The running gear in its preferred embodiment comprises a hollow cylindrical axle 1 having a central chamber 2 which extends from end to end through the axle and is preferably of uniform diameter. I prefer to make the axle out of heavy steel tubing with the bearing portions and ends case hardened as indicated by the shading in Figs. 1 and 2. Into this chamber I introduce grease, packing the chamber with that as a lubricant and then I mount the hub 3 of the wheel 4 on one end of the axle. The outer end of the hub is closed by an integral part 5 and through the center of this and concentric with the axle I pass a bolt 6 having a hexagon head 7 which engages the outer wall of the hub. The bolt makes a close running fit in the opening provided for it in the hub, and is sufficiently long to project through and beyond the other end of the axle, its end thus exposed being threaded and screwed into a threaded opening 8 in the portion 5 of the hub of wheel 9. A lock nut 10 is then screwed on the end of the bolt and a cotter pin 11 passed through the nut. The bolt thus holds the two hubs of the wheels tied together in running position on the axle. The bore of the hub may be provided with a spiral channel 12 semicircular in cross section or any other design of feed groove for the lubricant may be used. The grease has access to the bearings through the open ends of the axle. To facilitate the grease working out from chamber 2, I tap it and screw in a plug 13 having an air vent which permits entrance of air and this plug may be unscrewed as a means for introducing grease to fill the axle, though the preferable manner is to remove the nut 10 and wheel 9 and fill the chamber 2 through the open end of the axle. The nut 10 permits the two wheels to be adjusted relatively to different track gages and as I do not prefer to draw the two wheels into close running contact with the ends of the axle, I provide for a small lateral play of the wheels on the axle which acts as a pump at one end to suck out the grease from the axle and at the other end as a means to force the grease into the bearing. In order to reduce the wear between the ends of the axle and the inner walls of the hub portions 5, the latter are cast with chill faces 29 against which the case hardened ends of the axle will abut as the wheels play laterally. Substantially the same results may be obtained in connection with the fastening means shown in Fig. 2, where I use an axle 1ª, similar to 1, and having the grease chamber 2. In this case, instead of extending a bolt 6 entirely through the chamber 2, (which may however be done) I weld a metal plug 14 in one end of the axle, but before welding it in position I insert through a central opening in the plug a bolt 15 which has its head 16 engaging the inner face of the plug and has its outer end threaded and adapted to screw into the threaded opening 17 in the hub of wheel 18 and to receive a lock nut 19 through which I pass a cotter pin 20 which secures the wheel against disengagement from the axle. The head 16 of the bolt is provided with a transverse slot 21 and the outer end of the bolt 15 is squared at 22 to receive a wrench. To mount the wheel 18 on the axle its threaded opening 17 is moved opposite the threaded end of the bolt 15 which is held against rotation by a long screw driver which is passed through the axle chamber 2 and engages in slot 21 and then the wheel is turned and screwed onto the bolt until the end 22 of the bolt projects without the wheel so that it can be engaged by a wrench and turned while the wheel is held, thereby drawing the wheel onto the axle. The nut 19 is then screwed onto the end of the bolt and held by cotter pin 20 to lock the wheel in running position. The wheel 18 is thus mounted free for rotation on the axle 1ª which at its other end is internally threaded and has the hub 23 of the wheel 24 shrunk on it or otherwise held rigid thereon. A pipe plug 25 is screwed into the threaded end of the axle which turns with wheel 24 in suitable bearings 26. The axle 1ª in this construction has oil openings 27 opposite its several bearing points through which the grease works into the bearings. Inasmuch as the bolt is screwed tight into the hub of the wheel 18, there is no opportunity for dirt to work into the bearing at this point. The friction between the nut 15 and the plug 14 is negligible, since it occurs only when compensating movement is required of the wheel 18 in rounding curves.

In operation, the grease which fills the chamber 2 in the axle gradually works out through the open ends of the axle in Fig. 1. In the case of Fig. 2 it works out through the openings 27, the force exerted centrifugally on the grease being directed to supply it to the bearings proportionately to the speed of rotation and therefore to the demands of the bearings. This action is exactly opposite to the force exerted centrifugally on oil or grease in chambers in the wheels or hubs, for there it acts to draw the lubricant from the bearing when most needed. In wheels which run continuously in a given direction it will be inadvisable to provide the spiral grooves 12 and the plane groove 28 in the axle may be substituted, as shown in Fig. 2. In the ordinary mine car which runs back and forth in the mine and the wheels of which rotate in both directions equally, the spiral groove most effectively applies the lubricant, moving it in both directions over the whole face of the bearing.

My fastening means is practically frictionless, the wheels run freely and with the requisite lateral play on the axles, the bearing surfaces can be hardened to give the maximum wear at the least expense and a tubular axle provides the maximum storage capacity for lubricant and at a substantial decrease in cost as compared with constructions which provide the lubricant chamber in the wheel.

Having thus described my invention, what I claim as new and desire to secure by Letters Patent, is:—

1. In a running gear for cars, a hollow axle open at its ends and having cylindrical wheel bearings, wheels having hubs which are mounted on said cylindrical bearings and which have closed ends which serve to close the open ends of the axle, means to tie said wheels together free of the axles, which means extend longitudinally through the axle, and means to introduce lubricant within the axle, said wheels being connected together to permit of their adjustment together bodily and longitudinally on the axle to a predetermined extent, substantially as and for the purposes described.

2. In combination, an axle formed of a heavy tubing, wheels having hubs, which fit over and close the open ends of the axle which is adapted to be filled with lubricant, and means to tie the wheels together which passes centrally through the axle, said tie means holding said wheels connected to move together longitudinally on said axle, as and for the purposes described.

3. In a running gear for cars, the combination of a hollow axle formed of tubing case hardened at its bearing ends which are left open, the bearings being cylindrical, of wheels having hubs closed at their outer ends and adapted to be mounted on and close the open ends of the axle, a retaining bolt which passes centrally through the axle and through the wheel hubs, said bolt passing loosely through one hub and being screwed into the other to hold said wheels adjusted for a limited longitudinal play on said axle, and a head on the bolt to engage the hub of the wheel loose thereon, substantially as described.

4. In a running gear for cars, the combination of a hollow axle formed of tubing open at each end and filled with grease, of wheels having hubs which are mounted on said axle and are closed at their outer ends which are cast with an internal chill hardened bearing face opposite the end of the axle, a wheel retaining bolt which passes centrally through the axle and adjustably connects the wheel hubs and holds them in running position on the axle, the ends of the hubs being held spaced from the ends of the axle to permit a limited longitudinal adjustment of the wheels thereon, substantially as described.

5. In a running gear for cars, an axle formed of heavy tubing, wheels having hubs which fit over and rotate on the ends of said tubing, a bolt which is passed axially through the tubing and through the hubs, means on said bolt to adjustably connect the wheels thereon, said wheels being connected so as to provide a limited lateral play on the axle, said axle being adapted to be filled with grease, and having an air hole, substantially as described.

6. In a running gear for cars, a hollow axle adapted to be filled with grease and having its ends left open, wheels mounted on the ends of said axle and having hubs closed at their outer ends and adapted to form movable end closures for the hollow axle, and retaining means to limit the endwise play of the wheels on the axle.

7. In a running gear for cars, a hollow axle adapted to be filled with lubricant and having at least one open end, wheels mounted on said axle, the wheel mounted on the open end of the axle having a hub closed at its outer end to form a movable end closure for said open end of the axle, and retaining means to limit the endwise play of said latter wheel hub on the axle, as and for the purposes described.

JOHN F. FOX.